US012603569B2

(12) United States Patent
Chan

(10) Patent No.: US 12,603,569 B2
(45) Date of Patent: Apr. 14, 2026

(54) POWER SUPPLY WITH DYNAMIC CONTROL OF RESONANT MODE

(71) Applicant: ACER INCORPORATED, New Taipei (TW)

(72) Inventor: Tzu-Tseng Chan, New Taipei (TW)

(73) Assignee: ACER INCORPORATED, New Taipei City (TW)

( * ) Notice: Subject to any disclaimer, the term of this patent is extended or adjusted under 35 U.S.C. 154(b) by 236 days.

(21) Appl. No.: 18/633,498

(22) Filed: Apr. 11, 2024

(65) Prior Publication Data

US 2025/0219531 A1    Jul. 3, 2025

(30) Foreign Application Priority Data

Jan. 3, 2024    (TW) ................................. 113100207

(51) Int. Cl.
| | |
|---|---|
| *H02M 1/42* | (2007.01) |
| *H02M 1/00* | (2006.01) |
| *H02M 3/00* | (2006.01) |
| *H02M 3/335* | (2006.01) |
| *H02M 7/217* | (2006.01) |

(52) U.S. Cl.
CPC ....... *H02M 1/4241* (2013.01); *H02M 1/0009* (2021.05); *H02M 1/0025* (2021.05); *H02M 1/0032* (2021.05); *H02M 1/0058* (2021.05); *H02M 1/007* (2021.05); *H02M 1/4225* (2013.01); *H02M 3/01* (2021.05); *H02M 3/33569* (2013.01); *H02M 7/217* (2013.01)

(58) Field of Classification Search
CPC ............. H02M 1/4241; H02M 1/0009; H02M 1/0025; H02M 1/0032; H02M 1/0058; H02M 1/007; H02M 1/4225; H02M 3/01; H02M 3/33569; H02M 7/217

See application file for complete search history.

(56) References Cited

U.S. PATENT DOCUMENTS

| | | | | |
|---|---|---|---|---|
| 9,030,185 | B2 * | 5/2015 | Nishibori | G05F 1/70 323/222 |
| 9,871,458 | B2 * | 1/2018 | Fan | H02M 3/33592 |
| 11,336,173 | B1 * | 5/2022 | Peng | H02M 3/01 |
| 11,394,307 | B2 * | 7/2022 | Chen | H02M 7/04 |
| 2009/0010031 | A1 * | 1/2009 | Kuan | H05B 41/2822 363/101 |
| 2009/0230929 | A1 * | 9/2009 | Sui | H02M 1/4208 323/207 |

(Continued)

*Primary Examiner* — Yusef A Ahmed
(74) *Attorney, Agent, or Firm* — Winston Hsu

(57) ABSTRACT

A power supply includes an active power factor correction circuit, a resonant converting circuit, a zero-current detecting circuit and a control circuit. The control circuit provides a first control signal for operating the active power factor correction circuit, and provides second and third control signals for operating the resonant converting circuit. The zero-current detecting circuit monitors the status of boost inductor current in the active power factor correction circuit. When the boost inductor current is not in a zero-current state, the resonant converting circuit is configured to operate in a single-element resonant mode. When the boost inductor current is in the zero-current state, the resonant converting circuit is configured to operate in a multi-element resonant mode, thereby reducing overall resonation energy and resonation loss.

15 Claims, 3 Drawing Sheets

(56) References Cited

U.S. PATENT DOCUMENTS

| | | | | | |
|---|---|---|---|---|---|
| 2011/0292688 A1* | 12/2011 | Zhang | H02M 1/32 | | |
| | | | 363/21.02 | | |
| 2011/0317450 A1* | 12/2011 | Cheng | H02M 1/4258 | | |
| | | | 363/20 | | |
| 2013/0083564 A1* | 4/2013 | Bai | H02M 3/33592 | | |
| | | | 363/21.02 | | |
| 2014/0077770 A1* | 3/2014 | Omoto | H02M 1/0085 | | |
| | | | 320/140 | | |
| 2014/0091720 A1* | 4/2014 | Brinlee | H05B 45/375 | | |
| | | | 315/186 | | |
| 2014/0153288 A1* | 6/2014 | Yonezawa | H02M 3/33569 | | |
| | | | 363/16 | | |
| 2014/0167640 A1* | 6/2014 | Knoedgen | H02M 1/36 | | |
| | | | 315/239 | | |
| 2015/0124489 A1* | 5/2015 | Dai | H02M 3/335 | | |
| | | | 363/17 | | |
| 2015/0162821 A1* | 6/2015 | Wu | H02M 1/4258 | | |
| | | | 363/21.17 | | |
| 2015/0198634 A1* | 7/2015 | Brinlee | G01R 31/28 | | |
| | | | 324/72.5 | | |
| 2015/0263603 A1* | 9/2015 | Pahlevaninezhad | | | |
| | | | H02M 1/4225 | | |
| | | | 363/17 | | |
| 2016/0141951 A1* | 5/2016 | Mao | H02M 1/36 | | |
| | | | 363/21.02 | | |
| 2016/0329817 A1* | 11/2016 | Liu | H02M 3/33573 | | |
| 2016/0352231 A1* | 12/2016 | Quigley | H02M 1/36 | | |
| 2017/0288557 A1* | 10/2017 | Fang | H02M 1/15 | | |
| 2019/0267886 A1* | 8/2019 | Hung | H02M 1/08 | | |
| 2020/0373845 A1* | 11/2020 | Jang | H02M 3/01 | | |
| 2020/0403507 A1* | 12/2020 | Chan | H02M 1/126 | | |
| 2021/0399643 A1* | 12/2021 | Oh | H02M 1/4258 | | |
| 2022/0069722 A1* | 3/2022 | Pan | H02M 1/0009 | | |
| 2023/0129443 A1* | 4/2023 | Liu | H02M 3/33571 | | |
| | | | 363/21.12 | | |
| 2023/0179113 A1* | 6/2023 | Yaguchi | H02M 1/0009 | | |
| | | | 363/127 | | |
| 2023/0261508 A1* | 8/2023 | Chan | H02M 1/007 | | |
| | | | 320/166 | | |
| 2023/0318466 A1* | 10/2023 | Chan | H02M 1/4208 | | |
| 2023/0327561 A1* | 10/2023 | Chan | H02M 1/4225 | | |
| | | | 363/21.18 | | |
| 2023/0412069 A1* | 12/2023 | Hung | H02M 3/33515 | | |
| 2024/0079961 A1* | 3/2024 | Chan | H02M 1/0058 | | |
| 2024/0283366 A1* | 8/2024 | Chan | H02M 3/33576 | | |
| 2025/0030354 A1* | 1/2025 | Yaguchi | H02M 1/12 | | |
| 2025/0070679 A1* | 2/2025 | Tomioka | H02M 1/36 | | |

* cited by examiner

POWER SUPPLY WITH DYNAMIC CONTROL OF RESONANT MODE

BACKGROUND OF THE INVENTION

1. Field of the Invention

The present invention is related to a power supply with dynamic control of resonant mode, and more particularly, to a power supply capable of dynamically switching resonant mode based on status of inductor current.

2. Description of the Prior Art

Power supply circuits commonly used to convert alternative-current (AC) power into direct-current (DC) voltages for driving various components in a computer system which may have different operating voltages. The unlimited extraction of natural resources and the consequences of overlooking the environmental costs of such behavior have made more and more people aware of the importance of eco-design measures. Many frameworks have been established for the setting of eco-design requirements for energy-using products, such as consumer electronics, office equipment, household appliances, or power supplies. For example, Energy Star is a program run by the U.S. Environmental Protection Agency (EPA) and U. S. Department of Energy (DOE) that promotes energy efficiency. The program provides information on the energy consumption of products and devices using different standardized methods.

For a power supply with a rated output power larger than 70 W and its related system design, its rated power factor is required to be larger than 0.9 according to Energy Star standard. Therefore, a high-power power supply typically includes a boost front-end circuit and a buck back-end circuit. The boost front-end circuit of the high-power power supply may be a boost active power factor correction (PFC) circuit capable of improving the power factor of the AC voltage. The buck back-end circuit of the high-power power supply may be a resonant converting circuit capable of converting a high voltage outputted by the boost active PFC circuit into a low voltage for supplying the operation of a loading device. On the other hand, in order to meet the requirement of stricter power-saving specification, a power supply usually adopts a voltage-stabilizing feedback compensation circuit for adjusting the switching frequency of the power switch, thereby stabilizing the output voltage of the power supply.

A boost active PFC circuit may operate in a continuous conduction mode (CCM), a boundary conduction mode (CCM) and a discontinuous conduction mode (DCM). In the CCM, the boost active PFC circuit adopts a current-feedback control scheme in which the input current is modified based on the phase and the amplitude of the input voltage waveform. CCM is characterized by inductor current flowing continuously in either the primary or the secondary windings and is suitable for heavy-load applications. In the BCM, the boost active PFC circuit adopts a frequency conversion control scheme in which the power switch is turned on when the inductor current drops to zero. BCM is characterized in highly efficient zero-current switching of the power switch and is suitable for light-load applications. In the DCM, the boost active PFC circuit adopts a voltage-follower control scheme in which the inductor current drops to zero when the power switch is turned off. Generally speaking, a boost active PFC circuit is configured to operate in CCM under heavy-load conditions in order to able to handle larger output current, and operate in DCM under light-load conditions in order to reduce power consumption.

However, in the prior art power supply when the boost active PFC circuit operates in DCM, the resonant converting circuit and the voltage-stabilizing feedback compensation circuit still consumes a considerable amount of power. Therefore, there is a need for a power supply capable of dynamically switching its resonant mode and controlling its voltage-stabilizing feedback compensation loop based on the status of the inductor current, thereby reducing the overall resonant/voltage-stabilizing feedback compensation energy and loss.

SUMMARY OF THE INVENTION

The present invention provides a power supply with dynamic control of resonant mode. The power supply includes a boost active PFC circuit, a resonant converting circuit, a zero-current detecting circuit and a control circuit. The boost PFC circuit is configured to convert an AC voltage provided by AC mains into a DC voltage and then convert the DC voltage into a pulse DC voltage. The boost PFC circuit includes a boost inductor and a power switch. The boost inductor is configured to store or discharge energy of the DC voltage, and includes a first end coupled to the DC voltage and a second end. The power switch is configured to control the boost inductor to store and discharge the energy of the DC voltage according to a first control signal, and includes a first end coupled to the second end of the boost inductor, a second end coupled to a first ground level and a control end for receiving the first control signal which periodically switches between a first enable level and a first disable level. The resonant converting circuit is configured to convert the pulse DC voltage into an output voltage, and includes a transformer, a first resonant switch, a second resonant switch and a resonant tank. The transformer is configured to transfer energy of the pulse DC voltage from a first primary side to a first secondary side for supplying the output voltage, and includes a primary winding disposed on the first primary side and including a first dotted terminal and a first undotted terminal, a first secondary winding disposed on the secondary side and including a second dotted terminal and a second undotted terminal, and a second secondary winding disposed on the first secondary side and including a third dotted terminal and a third undotted terminal, wherein the second undotted terminal is coupled to the third dotted terminal. The first resonant switch is configured to control an operation of the resonant converting circuit according to a second control signal, and includes a first end coupled to the pulse DC voltage, a second end, and a control end for receiving the second control signal which periodically switches between a second enable level and a second disable level. The second resonant switch is configured to control the operation of the resonant converting circuit according to a third control signal, and includes a first end coupled to the first dotted terminal, a second end coupled to the first ground level, and a control end for receiving the third control signal which periodically switches between a third enable level and a third disable level. The resonant tank is coupled to the first resonant switch, the second resonant switch and the primary winding, and configured to selectively operate in a multi-element resonant mode or in a single-element resonant mode according to a fourth control signal. The zero-current detecting circuit is configured to detect a boost inductor current flowing through the boost inductor, output the fourth control signal having a fourth enable level for controlling the resonant tank to operate in the single-element resonant mode when determining that the boost inductor current is in a zero-current state, and output the fourth control signal having a fourth disable level for controlling the resonant tank to operate in the multi-element resonant mode when determining that the boost inductor current is not in the zero-current state. The control circuit is configured to provide the first control signal, the second control signal and the third control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
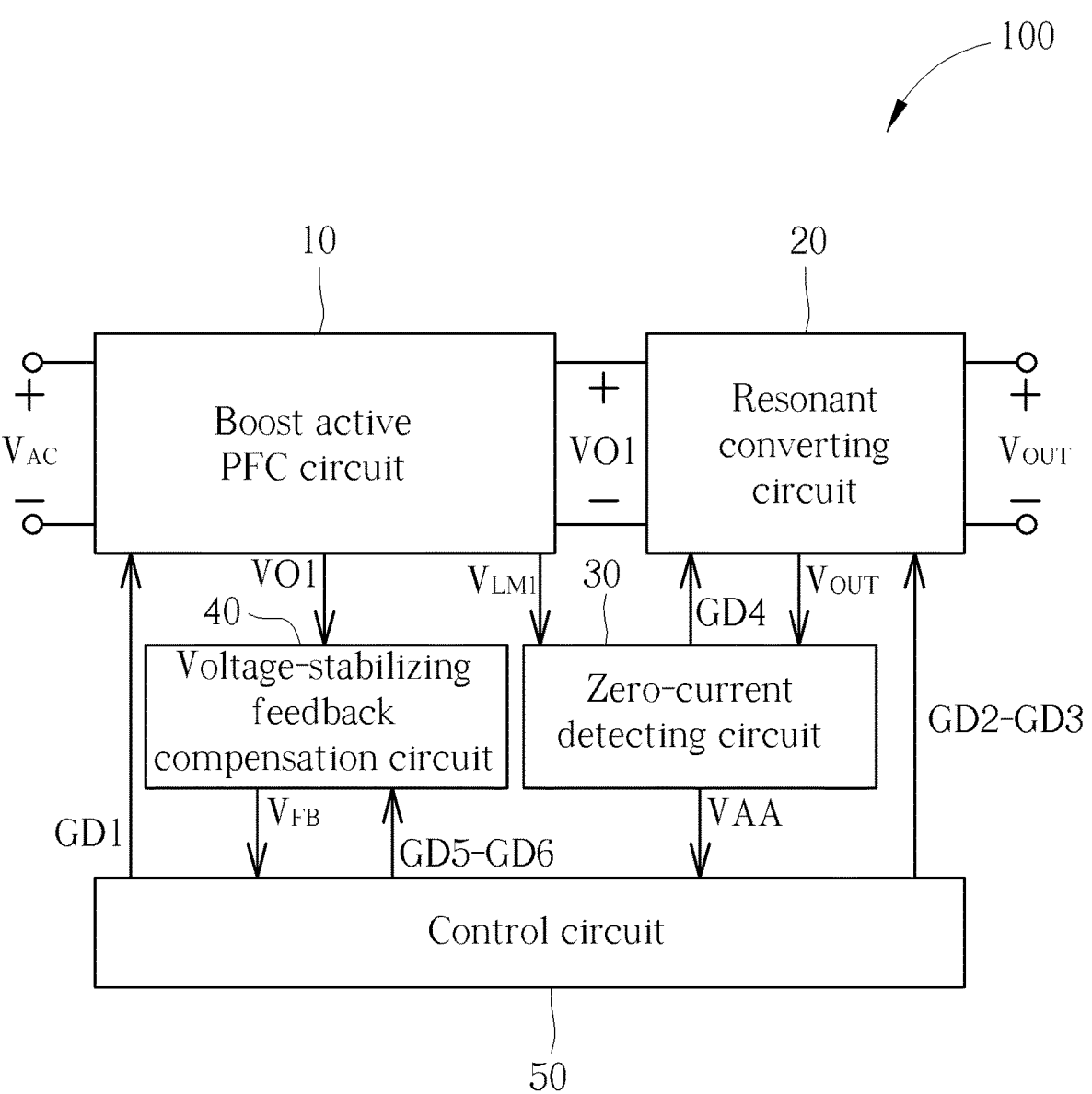
FIG. 1 is a functional diagram illustrating a power supply with dynamic control of resonant mode according to an embodiment of the present invention.

FIG. 1 is a functional diagram illustrating a power supply 100 with dynamic control of resonant mode according to an embodiment of the present invention. The power supply 100 includes a boost active PFC circuit 10, a resonant converting circuit 20, a zero-current detecting circuit 30, a voltage-stabilizing feedback compensation circuit 40, and a control circuit 50. The power supply 100 is configured to convert an AC voltage $V_{AC}$ provided by AC mains into an output voltage $V_{OUT}$ for driving a loading device (not shown in FIG. 1).

The boost active PFC circuit 10 is configured to convert the AC voltage $V_{AC}$ provided by AC mains into a pulse DC voltage VO1. The resonant converting circuit 20 is configured to convert the high-level pulse DC voltage VO1 outputted by the boost active PFC circuit 10 into the low-level output voltage $V_{OUT}$. The zero-current detecting circuit 30 is configured to detect a boost inductor voltage $V_{LM1}$ (associated with the boost inductor current generated by the boost active PFC circuit 10 during operation), thereby providing a control signal GD4 for switching the resonant mode of the resonant converting circuit 20. Also, the zero-current detecting circuit 30 is further configured to provide a logic signal VAA according the value of the boost inductor voltage $V_{LM1}$ and the value of the output voltage $V_{OUT}$. The voltage-stabilizing feedback compensation circuit 40 is configured to monitor the status of the pulse DC voltage VO1 for providing a corresponding feedback voltage $V_{FB}$. The control circuit 50 is configured to provide a control signal GD1 for controlling the operation of the boost active PFC circuit 10, provide control signals GD2-GD3 for controlling the operation of the resonant converting circuit 20, provide control signals GD5-GD6 for controlling the operation of the voltage-stabilizing feedback compensation circuit 40, adjust the duty cycle of the control signal GD1 according to the feedback voltage $V_{FB}$ for performing voltage stabilization, and adjust the levels of the control signals GD5-GD6 according to the logic signal VAA for selectively activating or deactivating the voltage-stabilizing feedback compensation circuit 40.

Figure 2:
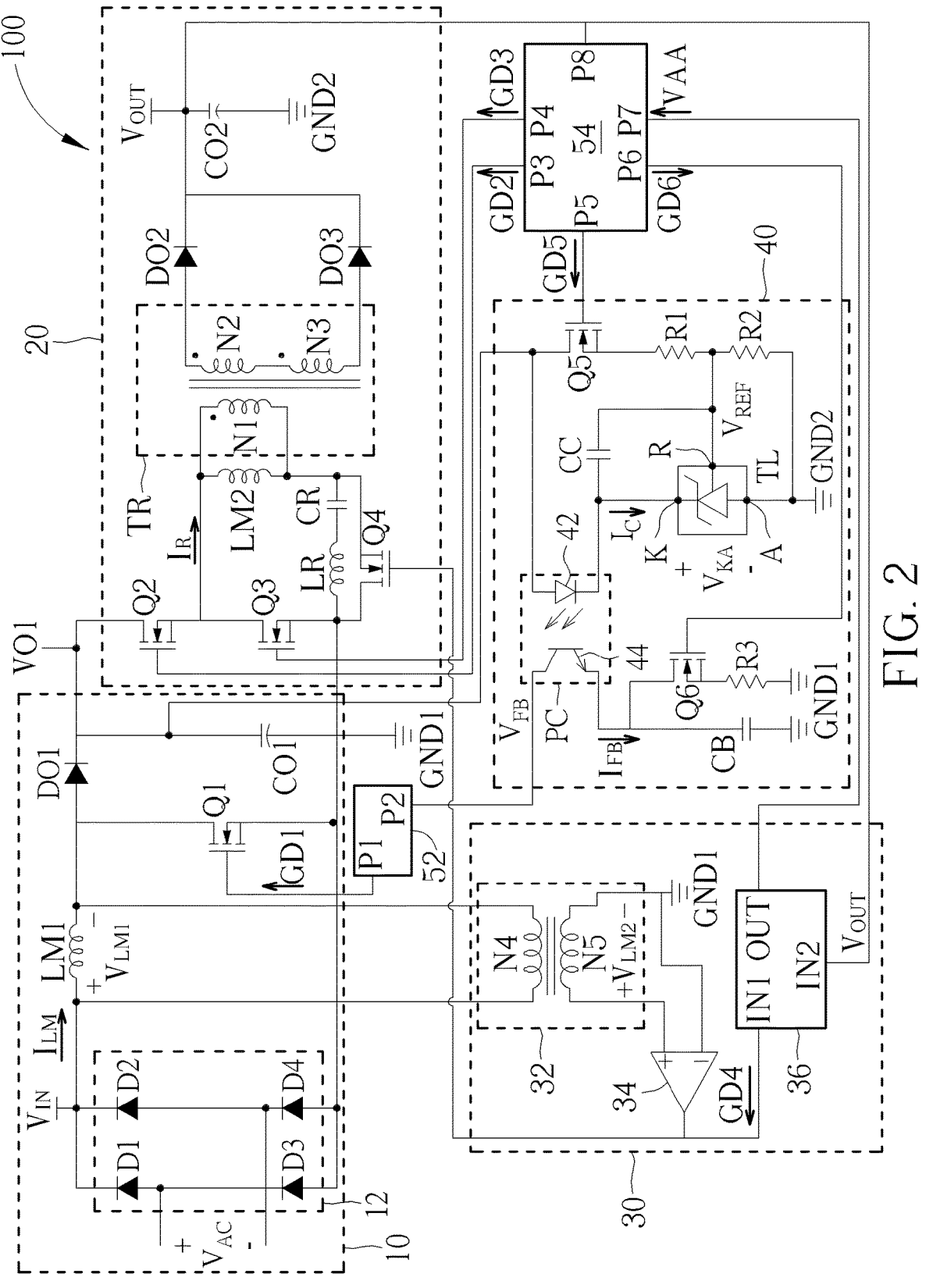
FIG. 2 is a diagram illustrating an implementation of a power supply according to an embodiment of the present invention.

FIG. 2 is a diagram illustrating an implementation of the power supply 100 according to an embodiment of the present invention. The control circuit 50 in the power supply 10 may include a pulse width modulation (PWM) integrated circuit 52 and a microcontroller unit (MCU) 54, but is not limited thereto. The PWM integrated circuit 52 is configured to output the control signal GD1 which periodically switches between a first enable level and a first disable level for controlling the operation of the boost active PFC circuit 10. The MCU 54 is configured to provide the control signal GD2 which periodically switches between a second enable level and a second disable level and the control signal GD3 which periodically switches between a third enable level and a third disable level for controlling the operation of the resonant converting circuit 20, and provide the control signal GD5 which periodically switches between a fifth enable level and a fifth disable level and the control signal GD6 which periodically switches between a sixth enable level and a sixth disable level for controlling the operation of the voltage-stabilizing feedback compensation circuit 40. The operation of the control circuit 50 will be described in more detail in subsequent paragraphs.

In the embodiment depicted in FIG. 2, the boost active PFC circuit 10 in the power supply 100 includes a rectifier 12, a power switch Q1, a boost diode DO1, a storage capacitor C1, and a boost inductor LM1. The boost active PFC circuit 20 is configured to provide the pulse DC voltage VO1 according to the AC voltage $V_{AC}$ provided by AC mains. In an embodiment of the present invention, the rectifier 12 may be implemented as a bridge rectifier which includes rectifying diodes D1-D4 for converting the AC voltage $V_{AC}$ provided by AC mains into a DC voltage $V_{IN}$. However, the implementation of the rectifier 12 does not limit the scope of the present invention.

The boost inductor LM1 includes a first end coupled to the rectifier 12 for receiving the DC voltage $V_{IN}$ and a second end selectively coupled to a ground level GND1 via the power switch Q1 for storing the energy of the DC voltage $V_{IN}$, wherein the boost inductor current $I_{LM}$ flowing through the boost inductor LM1 is the input current of the power supply 100. The boost diode DO1 includes an anode coupled to the second end of the boost inductor LM1 and a cathode coupled to the resonant converting circuit 20 and the storage capacitor CO1. The storage capacitor CO1 includes a first end coupled to the cathode of the boost diode DO1 and a second end coupled to the ground level GND1 for storing the energy of the pulse DC voltage VO1. The power switch Q1 includes a first end coupled between the second end of the boost inductor LM1 and the anode of the boost diode DO1, a second end coupled to the ground level GND1, and a control end coupled to the PWM integrated circuit 52 in the control circuit 50 for receiving the control signal GD1. The power switch Q1 is periodically turned on and turned off according to the control signal GD1 so as to allow the boost inductor LM1 to store energy and discharge energy. This way, the input current may vary with the input voltage, thereby increasing the power factor and decreasing current harmonics.

In the boost active PFC circuit 10, the boost inductor LM1, the boost diode DO1, the storage capacitor CO1 and the power switch Q1 are operated to achieve voltage step-up purpose. When the power switch Q1 is turned on during the supply period of the AC voltage $V_{AC}$ by AC mains, the second end of the boost inductor LM1 is coupled to the ground level GND1 so that the boost inductor LM1 may sense the variations in the DC voltage $V_{IN}$ and the resulting time-varying magnetic field induces an electromotive force (voltage) which is stored as magnetic energy in the boost inductor LM1. When the power switch Q1 is turned off during the supply period of the AC voltage $V_{AC}$ by AC mains, the boost inductor LM1 is cut off from the ground level GND1 and its stored magnetic energy is converted into electrical energy, thereby generating large current which charges the storage capacitor CO1 via the boost diode DO1. After the power switch Q1 switches between the turned-on state and turned-off state multiple times, the DC voltage $V_{IN}$ may be boosted to a desired level for supplying the pulse DC voltage VO1.

In the embodiment depicted in FIG. 2, the resonant converting circuit 20 includes a transformer TR, resonant switches Q2-Q3, a resonant tank, a storage capacitor CO2, and two output diodes DO2-DO3. The resonant converting circuit 20 is configured to receive the pulse DC voltage VO1 via its input end and convert the pulse DC voltage V1 into the output voltage $V_{OUT}$ for driving a loading device (not shown in FIG. 2).

In the resonant converting circuit 20 depicted in FIG. 2, the transformer TR includes a primary winding (represented by its number of turns N1) and two secondary windings (respectively represented by its number of turns N2 and N3). The primary winding N1 is disposed on the primary side of the transformer TR, and the secondary windings N2 and N3 are disposed on the secondary side of the transformer TR. The resonant switch Q2 includes a first end coupled the cathode of the boost diode DO1 in the boost active PFC circuit 10, a second end coupled the resonant switch Q3, and a control end coupled to the MCU 54 in the control circuit 50 for receiving the control signal GD2. The resonant switch Q3 includes a first end coupled the second end of the resonant switch Q2, a second end coupled the ground level GND1, and a control end coupled to the MCU 54 in the control circuit 50 for receiving the control signal GD3.

In the embodiment depicted in FIG. 2, the resonant tank of the resonant converting circuit 20 includes a magnetizing inductor LM2, a resonant inductor LR, a resonant capacitor CR, and an auxiliary switch Q4. The magnetizing inductor LM2 includes a first end coupled to the dotted terminal of the primary winding N1 in the transformer TR and a second end coupled the undotted terminal of the primary winding N1 in the transformer TR. The resonant capacitor CR includes a first end coupled to the undotted terminal of the primary winding N1 in the transformer TR and a second end coupled the resonant inductor LR. The resonant inductor LR includes a first end coupled to the second end of the resonant capacitor CR and a second end coupled the ground level GND1. The auxiliary switch Q4 includes a first end coupled to the first end of the resonant capacitor CR, a second end coupled the end of the resonant inductor LR, and a control end coupled to the zero-current detecting circuit 30 for receiving the control signal GD4. When the auxiliary switch Q4 is turned off by the control signal GD4 having a fourth disable level, the auxiliary switch Q4 is essentially open-circuited and does not affect the resonant loop. Under such circumstance, the resonant converting circuit 20 is configured to operate in a multi-element resonant mode, wherein the resonant inductor LR, the magnetizing inductor LM2 and the resonant capacitor CR form an inductor-inductor-capacitor (LLC) resonant circuit and IR represents the resonant current generated by the resonant converting circuit 20 during operation. When the auxiliary switch Q4 is turned on by the control signal GD4 having a fourth enable level, the auxiliary switch Q4 is essentially short-circuited, thereby bypassing the resonant inductor LR and the resonant capacitor CR. Under such circumstance, the resonant converting circuit 20 is configured to operate in a single-element resonant mode, wherein the magnetizing inductor LM2 forms a single-inductor resonant circuit and IR represents the resonant current generated by the resonant converting circuit 20 during operation. It is to be noted that the implementation of the resonant tank in the resonant converting circuit 20 does not limit the scope of the present invention.

In the resonant converting circuit 20 of the present invention, the output diode DO2 includes an anode coupled to the dotted terminal of the secondary winding N2 in the transformer TR and a cathode coupled to the output end of the power supply 100 (i.e., the output voltage $V_{OUT}$). The output diode DO3 includes an anode coupled to the undotted terminal of the secondary winding N3 in the transformer TR and a cathode coupled to the output end of the power supply 100 (i.e., the output voltage $V_{OUT}$). The storage capacitor CO2 includes a first end coupled to the cathode of the output diode DO2 and a second end coupled to a ground level GND2 for storing the energy of the output voltage $V_{OUT}$.

In the embodiment depicted in FIG. 2, the zero-current detecting circuit 30 of the power supply 100 includes a zero-current detecting unit 32, an error amplifier 34 and a logic circuit 36. The zero-current detecting unit 32 may be implemented using a transformer which includes a magnetizing winding (represented by its number of turns N4) and a sensing winding (represented by its number of turns N5). The magnetizing winding N4 is disposed on the primary side of the zero-current detecting unit 32 and coupled in parallel with the boost inductor LM1. The sensing winding N5 is disposed on the secondary side of the zero-current detecting unit 32, wherein the first end of the sensing winding N5 is coupled to the error amplifier 34 and the second end of the sensing winding N5 is coupled to the ground level GND1. The zero-current detecting unit 32 is configured to transfer the energy of the boost inductor voltage $V_{LM1}$ (the voltage established across the boost inductor LM1) from the magnetizing winding N4 to the sensing winding N5, thereby supplying a sensing voltage $V_{LM2}$ at its secondary side. The error amplifier 34 includes a first input end (such as a non-inverting input end) coupled to the first end of the sensing winding N5 for receiving the sensing voltage $V_{LM2}$, a second input end (such as an inverting input end) coupled to the ground level GND1, and an output end coupled to the logic circuit 36 and the control end of the auxiliary switch Q4 in the resonant converting circuit 20. Based on the value of the sensing voltage $V_{LM2}$, the error amplifier 34 is configured to output the corresponding control signal GD4. For example, when the boost inductor current $I_{LM}$ flowing through the boost inductor LM1 is in a zero-current state, the sensing voltage $V_{LM2}$ is at zero voltage. Under such circumstance, there is no voltage difference between the first input end and the second input end of the error amplifier 34, and the error amplifier 34 is configured to output the control signal GD4 having the fourth enable level at its output end. On the other hand, when the boost inductor current $I_{LM}$ flowing through the boost inductor LM1 is not in the zero-current state, the sensing voltage $V_{LM2}$ is not at zero voltage. Under such circumstance, there exists a voltage difference between the first input end and the second input end of the error amplifier 34, and the error amplifier 34 is configured to output the control signal GD4 having the fourth disable level at its output end.

In the embodiment depicted in FIG. 2, the logic circuit 36 includes a first input end IN1 coupled to the output end of the error amplifier 34 for receiving the control signal GD4, a second input end IN2 coupled to the output end of the power supply 100 for receiving the output voltage $V_{OUT}$, and an output end OUT for outputting a logic signal VAA to the MCU 54 in the control circuit 50. In an embodiment, the logic circuit 36 may be implemented using an AND gate. The logic circuit 36 is configured to output the logic signal VAA having a high level only when both its first input end IN1 and its second input end IN2 receive high-level signals. The logic circuit 36 is configured to output the logic signal VAA having a low level when any of its first input end IN1 and its second input end IN2 receives a low-level signal. However, the implementation of the logic circuit 36 does not limit the scope of the present invention.

In the embodiment depicted in FIG. 2, the voltage-stabilizing feedback compensation circuit 40 includes a linear optocoupler PC, a compensation capacitor CC, a feedback capacitor CB, a voltage regulator TL, resistors R1-R3 and auxiliary switches Q5-Q6. The auxiliary switch Q5 includes a first end coupled to the first end of the storage capacitor CO1 for receiving the pulse DC voltage VO1, a second end coupled the ground level GND2 via the resistors R1 and R2, and a control end coupled to the MCU 54 in the control circuit 50 for receiving the control signal GD5. The resistors R1 and R2 are coupled in series between the second end of the auxiliary switch Q5 and the ground level GND2 for establishing a reference voltage $V_{REF}$ associated with the pulse DC voltage VO1 across the resistor R2, wherein $V_{REF}$=VO1*R2/(R1+R2). The voltage regulator TL includes a reference terminal R coupled between the resistors R1 and R2 for receiving the reference voltage $V_{REF}$, an anode terminal A coupled to the ground level GND2, and a cathode terminal K coupled to the linear optocoupler PC, wherein $V_{KA}$ represents the voltage established across the cathode terminal K and the anode terminal A. The compensation capacitor CC includes a first end coupled to the cathode terminal K of the voltage regulator TL and a second end coupled to the reference terminal R of the voltage regulator TL. The voltage regulator TL is configured to adjust a compensation current $I_C$ flowing from its cathode terminal K to its anode terminal A according to the status of its reference terminal R. More specifically, the voltage regulator TL is configured to compare the reference voltage $V_{REF}$ received via its reference terminal R with a built-in baseline voltage and adjust its gain according to the difference between the reference voltage $V_{REF}$ and the built-in baseline voltage using the compensation capacitor CC coupled between its cathode terminal K and its reference terminal R. This way, the compensation current $I_C$ flowing through the voltage regulator TL may reflect the value of the reference voltage $V_{REF}$, thereby reflecting the value of the pulse DC voltage VO1.

The linear optocoupler PC includes a light-emitting diode 34 and a phototransistor 44, and is configured to perform electrical-optical-electrical conversion. The light-emitting diode 34 is coupled between a first input end and a second input end of the linear optocoupler PC, wherein the anode of the light-emitting diode 34 is coupled to the first end of the storage capacitor CO1 (i.e., the pulse DC voltage VO1) and the cathode of the light-emitting diode 34 is coupled to the cathode terminal K of the voltage regulator TL. The phototransistor 44 is coupled between a first output end and a second output end of the linear optocoupler PC, wherein the first end of the phototransistor 44 is coupled to the PWM integrated circuit 52 in the control circuit 50 and the second end of the phototransistor 44 is coupled to the feedback capacitor CB. The feedback capacitor CB includes a first end coupled to the second end of the phototransistor 44 and a second end coupled to the ground level GND1. The auxiliary switch Q6 includes a first end coupled to the first end of the feedback capacitor CB, a second end coupled the ground level GND1 via the resistor R3, and a control end coupled to the MCU 54 in the control circuit 50 for receiving the control signal GD6. Since the compensation current $I_C$ flowing through the light-emitting diode 34 is associated with the value of the pulse DC voltage VO1, the linear optocoupler PC may detect the variations in the pulse DC voltage VO1 using the light-emitting diode 34 on its input side and convert the electrical energy associated with the variations in the pulse DC voltage VO1 into optical energy, which is then received by the phototransistor 44 on its output side and converted into a feedback current $I_{FB}$. This way, the feedback capacitor CB may be charged by the feedback current $I_{FB}$ for providing a corresponding feedback voltage $V_{FB}$ whose value is associated with the value of the pulse DC voltage VO1.

In the embodiment depicted in FIG. 2, the PWM integrated circuit 52 in the control circuit 50 includes pins P1 and P2, wherein the pin P1 is for outputting the control signal GD1 to the control end of the power switch Q1, and the pin Pp2 is coupled to the voltage-stabilizing feedback compensation circuit 40 for receiving the feedback voltage $V_{FB}$. The PWM integrated circuit 52 in the control circuit 50 is configured to adjust the duty cycle of the control signal GD1 according to the feedback voltage $V_{FB}$, thereby stabilizing the pulse DC voltage VO1.

In the embodiment depicted in FIG. 2, the MCU 54 in the control circuit 50 includes pins P3-P8, wherein the pin P3 is for outputting the control signal GD2 to the control end of the resonant switch Q2, the pin P4 is for outputting the control signal GD3 to the control end of the resonant switch Q3, the pin P5 is for outputting the control signal GD5 having a fifth enable level or a fifth disable level to the control end of the auxiliary switch Q5, the pin P6 is for outputting the control signal GD6 having a sixth enable level or a sixth disable level to the control end of the auxiliary switch Q6, the pin P7 is coupled to the zero-current detecting circuit 30 for receiving the logic signal VAA, and the pin P8 is coupled to the output end of the power supply 100 for receiving the output voltage $V_{OUT}$. The MCU 54 is configured to output the control signals GD2 and GD3 for activating the resonant loop of the resonant converting circuit 20 and adjust the levels of the control signals GD5 and GD6 according to the logic signal VAA for selectively activating or deactivating the voltage-stabilizing feedback compensation circuit 40.

As depicted in FIG. 2, when the power supply 100 is not connected to AC mains, all control signals are zero, and the power supply has zero output ($V_{OUT}$=0). When the power supply 100 is connected to AC mains, the boost active PFC circuit 10 starts to function first, and the rectifying circuit 12 is configured to convert the AC voltage $V_{AC}$ provided by AC mains into the DC voltage $V_{IN}$. The PWM integrated circuit 52 in the control circuit 50 is then configured to output the control signal GD1 which periodically switches between the first enable level and the first disable level via its pin P1 to the control end of the power switch Q1, so that the power switch Q1 may be periodically turned on and turned off correspondingly in order to allow the boost inductor LM1 to periodically store energy and discharge energy, thereby providing the boosted pulse DC voltage VO1 on the primary side of the transformer TR. For illustrative purpose, it is assumed that the power supply 100 operates under light-load conditions and the boost active PFC circuit 10 operates in the DCM accordingly.

On the other hand, the MCU 54 in the control circuit 50 is configured to output the control signal GD5 having the fifth enable level via its pin P5 for turning on the auxiliary switch Q5 and output the control signal GD6 having the sixth disable level via its pin P6 for turning off the auxiliary switch Q6, thereby activating the voltage-stabilizing feedback compensation circuit 40. Under such circumstance, the pulse DC voltage VO1 may be transmitted to the resistors R1 and R2 in the voltage-stabilizing feedback compensation circuit 40 via the turned-on auxiliary switch Q5. After voltage-dividing, the reference voltage $V_{REF}$ may be established across the resistor R2, wherein $V_{REF}=VO1*R2/(R1+R2)$. The voltage regulator TL is configured to compare the reference voltage $V_{REF}$ with the level of its reference terminal R. When detecting a voltage error between the reference voltage $V_{REF}$ and the level of its reference terminal R, the voltage regulator TL is configured to adjust its gain and the voltage $V_{KA}$ using the compensation capacitor CC, so that the compensation current $I_C$ flowing through the voltage regulator TL may reflect the value of the reference voltage $V_{REF}$. Next, the linear optocoupler PC may detect the variations in the compensation current $I_C$ using the light-emitting diode 34 on its input side and convert the electrical energy associated with the variations in the compensation current $I_C$ into optical energy, which is then received by the phototransistor 44 on its output side and converted into the feedback current $I_{FB}$. Since the value of the feedback voltage $V_{FB}$ is associated with the value of the pulse DC voltage VO1, the variations in the compensation current $I_C$ are associated with the variations in the pulse DC voltage VO1, and the value of the feedback voltage $V_{FB}$ may reflect the status of the pulse DC voltage VO1. The PWM integrated circuit 52 in the control circuit 50 may receive the feedback voltage $V_{FB}$ via its pin P2 and adjust the duty cycle of the control signal GD1 according to the feedback voltage $V_{FB}$, thereby adjusting the turn-on time of the power switch Q1 for stabilizing the pulse DC voltage VO1.

Next, the pulse DC voltage VO1 outputted by the boost active PFC circuit 10 during stable operation is the input voltage of the resonant converting circuit 20. The MCU 54 in the control circuit 50 is then configured to output the control signal GD2 which periodically switches between the second enable level and the second disable level via its pin P3 to the control end of the resonant switch Q2 and output the control signal GD3 which periodically switches between the third enable level and the third disable level via its pin P4 to the control end of the resonant switch Q3. The control signals GD2 and GD3 are complimentary signals each having the same duty cycle. More specifically, the control signal GD2 is at the second enable level when the control signal GD3 is at the third disable level, and the control signal GD2 is at the second disable level when the control signal GD3 is at the third enable level to achieving high-frequency complimentary switching of the resonant switches Q2 and Q3, so that the resonant inductor LR, the magnetizing inductor LM2 and resonant capacitor CR may resonate mutually (multi-element resonant mode) or the magnetizing inductor LM2 may resonate individually (single-device resonant mode), thereby achieving zero-voltage or zero-current soft switching for reducing switching loss. Under such circumstance, the transformer TR may transfer the energy of the pulse DC voltage VO1 stored on its primary winding N1 to the secondary windings N2 and N3 for supplying the output voltage $V_{OUT}$.

Based on Lenz's law, the boost inductor voltage $V_{LM1}$ established across the boost inductor LM1 varies with the boost inductor current $I_{LM}$ flowing through the boost inductor LM1. During the supply period of the AC voltage $V_{AC}$ when the control signal GD1 is at the first enable level, the boost inductor LM1 is coupled to the ground level GND1 via the turned-on power switch Q1 for performing the charging operation. During the charging operation, the boost inductor current $I_{LM}$ gradually increases, and the boost inductor voltage $V_{LM1}$ is a positive voltage with an increasing level. During the supply period of the AC voltage $V_{AC}$ when the control signal GD1 is at the first disable level, the charging path of the boost inductor LM1 is cut off by the turned-off power switch Q1 for performing the discharging operation. During the discharging operation, the boost inductor current $I_{LM}$ gradually decreases, and the boost inductor voltage $V_{LM1}$ is a positive voltage with a decreasing level.

As depicted in FIG. 2, the power supply 100 of the present invention can detect the status of the boost inductor current $I_{LM}$ between the charging operation and the discharging operation in the DCM using the zero-current detecting unit 32. The magnetizing winding N4 may transfer the instant inductor energy to the sensing winding N5. When the energy stored in the sensing winding N5 is not zero, it indicates that the boost inductor current $I_{LM}$ in the DCM is not in a zero-current state, and the sensing voltage $V_{LM2}$ provided by the zero-current detecting unit 32 at its secondary side is also not in a zero-voltage state. Under such circumstance, the non-zero sensing voltage $V_{LM2}$ results in a voltage difference between the first input end and the second input end of the error amplifier 34, and the error amplifier 34 is configured to output the control signal GD4 having the fourth disable level at its output end for turning off the auxiliary switch Q4. In this case, the resonant converting circuit 20 is configured to operate in the multi-element resonant mode in which the resonant inductor LR, the magnetizing inductor LM2 and the resonant capacitor CR form an LLC resonant circuit.

On the other hand, when the energy stored in the sensing winding N5 is zero, it indicates that the boost inductor current $I_{LM}$ in the DCM is in the zero-current state, and the sensing voltage $V_{LM2}$ provided by the zero-current detecting unit 32 at its secondary side is also in the zero-voltage state. Under such circumstance, the zero sensing voltage $V_{LM2}$ does not result in any voltage difference between the first input end and the second input end of the error amplifier 34, and the error amplifier 34 is configured to output the control signal GD4 having the fourth enable level at its output end for turning on the auxiliary switch Q4. In this case, the resonant converting circuit 20 is configured to operate in the single-element resonant mode in which the magnetizing inductor LM2 forms a single-inductor resonant circuit, thereby reducing resonant energy and loss.

During the supply period of the AC voltage $V_{AC}$ When the power supply can function normally, the output voltage $V_{OUT}$ provided by the resonant converting circuit 20 remains at a first level (such as a high voltage level). Under such circumstance, when the zero-detecting unit 32 detects that the boost inductor current $I_{LM}$ is in the zero-current state, both the first input end IN1 and the second input end IN2 of the logic circuit 36 are at a high voltage level, and the logic circuit 36 is thus configured to output the logic signal VAA having a second level (such as a high voltage level). When the MCU 54 in the control circuit 50 receives the logic signal VAA having the second level (such as a high voltage level) via its pin P7 and receives the output voltage $V_{OUT}$ having the first level (such as a high voltage level) via its pin P8, the MCU 54 is configured to output the control signal GD5 having the fifth disable signal via its pin P5 for turning off the auxiliary switch Q5 and output the control signal GD6 having the sixth enable signal via its pin P6 for turning on the auxiliary switch Q6. Under such circumstances, the signal path between the voltage-stabilizing feedback compensation circuit 40 and the boost active PFC circuit 10 is cut off, thereby stopping the voltage-stabilizing feedback compensation operation for reducing power consumption. On the other hand, the first end of the feedback capacitor CB is coupled to the ground level GND1 via the turned-on auxiliary switch Q6 and the resistor R3, thereby allowing the energy stored in the feedback capacitor CB to be discharged rapidly.

Figure 3:
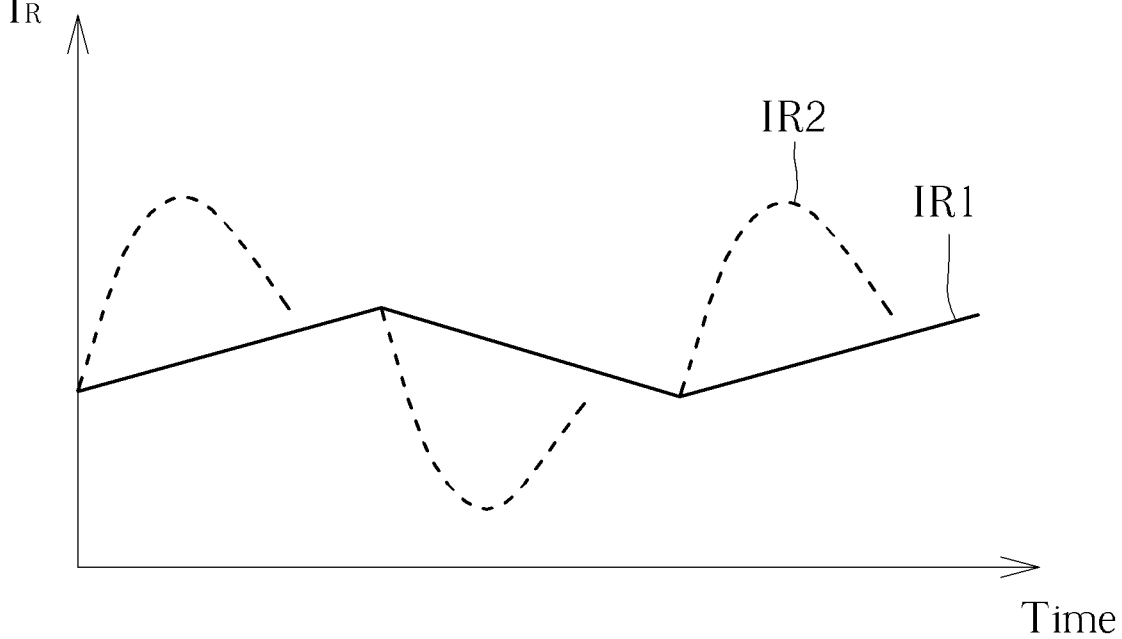
FIG. 3 is a diagram illustrating the waveforms of related signals during the operation of a power supply according to an embodiment of the present invention.

FIG. 3 is a diagram illustrating the waveforms of related signals during the operation of the power supply 100 according to an embodiment of the present invention. In FIG. 3, the vertical axis represents the resonant current IR generated during the operation of the resonant conversion circuit 20, the horizontal axis represents time, a curve IR1 (solid-line waveform) represents the resonant current in DCM when the boost inductor current $I_{LM}$ is in the zero-current state, and a curve IR2 (dotted-line waveform) represents the resonant current in DCM when the boost inductor current $I_{LM}$ is not in the zero-current state. As previously stated, when detecting that the boost inductor current $I_{LM}$ in DCM is in the zero-current state, the power supply 100 is configured to switch the resonant converting circuit 20 from the multi-element resonant mode to the single-element resonant mode and deactivate the voltage-stabilizing feedback compensation circuit 40 so that the resonant amplitude of the resonant current IR1 may be smaller than the resonant amplitude of the resonant current IR2, thereby reducing the overall resonant/voltage-stabilizing feedback compensation energy and loss.

In an embodiment of the present invention, each of the power switch Q1, the resonant switches Q2-Q3 and the auxiliary switches Q4-Q6 may be a metal-oxide-semiconductor field-effect transistor (MOSFET), a bipolar junction transistor (BJT), or another device with similar function. For N-type transistors, the enable level is logic 1 and the disable level is logic 0; for P-type transistors, the enable level is logic 0 and the disable level is logic 1. However, the types of the power switch Q1, the resonant switches Q2-Q3 and the auxiliary switches Q4-Q6 do not limit the scope of the present invention.

In conclusion, the power supply 100 of the present invention, the boost active PFC circuit 10 may improve the power factor of the AC voltage, the resonant converting circuit 20 may convert the voltage outputted by the boost active PFC circuit 10 into the output voltage $V_{OUT}$ required for driving a loading device, and the zero-current detecting circuit 30 may detect the status of the boost inductor current $I_{LM}$ in the boost active PFC circuit 10. When detecting that the output voltage $V_{OUT}$ is normal and the boost inductor current $I_{LM}$ is not in the zero-current state, the power supply 100 of the present invention is configured to activate the voltage-stabilizing feedback compensation circuit 40 for stabilizing the output voltage $V_{OUT}$, and the resonant converting circuit 20 is configured to operate in the multi-element resonant mode. When detecting that the output voltage $V_{OUT}$ is normal and the boost inductor current $I_{LM}$ is in the zero-current state, the power supply 100 of the present invention is configured to deactivate the voltage-stabilizing feedback compensation circuit 40, and the resonant converting circuit 20 is configured to operate in the single-element resonant mode. Therefore, the power supply 100 of the present invention can dynamically switch its resonant mode and control its voltage-stabilizing feedback compensation loop based on the status of the inductor current, thereby reducing the overall resonant/voltage-stabilizing feedback compensation energy and loss.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply with dynamic control of resonant mode, comprising:

a boost active power factor correction (PFC) circuit configured to convert an alternative-current (AC) voltage provided by AC mains into a direct-current (DC) voltage and then convert the DC voltage into a pulse DC voltage, and comprising:

a boost inductor configured to store or discharge energy of the DC voltage, and comprising:

a first end coupled to the DC voltage; and a second end;

a power switch configured to control the boost inductor to store and discharge the energy of the DC voltage according to a first control signal, and comprising:

a first end coupled to the second end of the boost inductor;

a second end coupled to a first ground level; and a control end for receiving the first control signal which periodically switches between a first enable level and a first disable level;

a resonant converting circuit configured to convert the pulse DC voltage into an output voltage, and comprising:

a transformer configured to transfer energy of the pulse DC voltage from a first primary side to a first secondary side for supplying the output voltage, and comprising:

a primary winding disposed on the first primary side and including a first dotted terminal and a first undotted terminal;

a first secondary winding disposed on the first secondary side and including a second dotted terminal and a second undotted terminal; and a second secondary winding disposed on the first secondary side and including a third dotted terminal and a third undotted terminal, wherein the second undotted terminal is coupled to the third dotted terminal;

a first resonant switch configured to control an operation of the resonant converting circuit according to a second control signal, and comprising:

a first end coupled to the pulse DC voltage;

a second end; and a control end for receiving the second control signal which periodically switches between a second enable level and a second disable level;

a second resonant switch configured to control the operation of the resonant converting circuit according to a third control signal, and comprising:

a first end coupled to the first dotted terminal;

a second end coupled to the first ground level; and a control end for receiving the third control signal which periodically switches between a third enable level and a third disable level; and a resonant tank coupled to the first resonant switch, the second resonant switch and the primary winding, and configured to selectively operate in a multi-element resonant mode or in a single-element resonant mode according to a fourth control signal;

a zero-current detecting circuit configured to:

detect a boost inductor current flowing through the boost inductor;

output the fourth control signal having a fourth enable level for controlling the resonant tank to operate in the single-element resonant mode when determining that the boost inductor current is in a zero-current state;

output the fourth control signal having a fourth disable level for controlling the resonant tank to operate in the multi-element resonant mode when determining that the boost inductor current is not in the zero-current state;

detect a status of the output voltage; and output a logic signal having a second level when determining that the boost inductor current is in the zero-current state and the output voltage is at a first level, wherein the zero-current detecting circuit comprises:

a zero-current detecting unit configured to transfer energy of the boost inductor current from a second primary side to a second secondary side for supplying a sensing voltage, and comprising:

a magnetizing winding disposed on the second primary side, wherein a first end of the magnetizing winding is coupled to the first end of the boost inductor and a second end of the magnetizing winding is coupled to the second end of the boost inductor; and a sensing winding disposed on the second secondary side, wherein a first end of the sensing winding is for providing the sensing voltage and a second end of the sensing winding is coupled to the first ground level;

an error amplifier configured to selectively provide the fourth control signal having a fourth enable level or a fourth disable level based on a level of the sensing voltage, and including:

a first input end coupled to the first end of the sensing winding for receiving the sensing voltage;

a second input end coupled to the first ground level; and an output end for outputting the fourth control signal; and a logic circuit configured to selectively provide the logic signal having the second level based on a level of the fourth control signal and a level of the output voltage, and including:

a first input end coupled to the output end of the error amplifier for receiving the fourth control signal;

a second input end for receiving the output voltage; and an output end for outputting the logic signal;

a voltage-stabilizing feedback compensation circuit configured to selectively provide a feedback voltage associated with the pulse DC voltage according to a fifth control signal; and a control circuit configured to:

provide the first control signal, the second control signal, the third control signal and the fifth control signal;

control a duty cycle of the first control signal according to the feedback voltage;

receive the logic signal;

output the fifth control signal having a fifth disable level for deactivating the voltage-stabilizing feedback compensation circuit when determining that the logic signal is at the second level; and output the fifth control signal having a fifth enable level for activating the voltage-stabilizing feedback compensation circuit when determining that the logic signal is not at the second level.

2. The power supply of claim 1, wherein the resonant tank comprises:

a magnetizing inductor, including:

a first end coupled to the first dotted terminal; and a second end coupled to the first undotted terminal;

a resonant capacitor, including:

a first end coupled to the first undotted terminal; and a second end;

a resonant inductor, including:

a first end coupled to the second end of the resonant capacitor; and a second end coupled to the first ground level; and a first auxiliary switch, including:

a first end coupled to the first end of the resonant capacitor;

a second end coupled to the second end of the resonant inductor; and a control end coupled to the zero-current detecting circuit for receiving the fourth control signal.

3. The power supply of claim 2, wherein the zero-current detecting circuit is further configured to:

output the fourth control signal having the fourth enable level for turning on the first auxiliary switch when determining that the boost inductor current is in the zero-current state, thereby controlling the resonant tank to operate in the single-element resonant mode using the magnetizing inductor; and output the fourth control signal having the fourth disable level for turning off the first auxiliary switch when determining that the boost inductor current is not in the zero-current state, thereby controlling the resonant tank to operate in the multi-element resonant mode using the resonant inductor, the magnetizing inductor and the resonant capacitor.

4. The power supply of claim 1, wherein the control circuit comprises:

a pulse width modulation (PWM) integrated circuit configured to receive the feedback voltage and provide the first control signal according to the feedback voltage; and a microcontroller unit (MCU) configured to provide the second control signal, the third control signal and the fifth control signal.

5. The power supply of claim 4, wherein the PWM integrated circuit in the control circuit is further configured to adjust the duty cycle of the first control signal according to the feedback voltage.

6. The power supply of claim 1, wherein the voltage-stabilizing feedback compensation circuit comprises:

a second auxiliary switch, including:

a first end coupled to the pulse DC voltage;

a second end; and a control end coupled to the control circuit for receiving the fifth control signal;

a first resistor and a second resistor coupled in series between the second end of the second auxiliary switch and a second ground level for providing a reference voltage associated with the pulse DC voltage;

a voltage regulator including a cathode terminal, an anode terminal and a reference terminal, and configured to adjust a compensation current flowing from the cathode terminal to the anode terminal according to a status of the reference voltage;

a linear optocoupler configured to detect a variation in the compensation current, convert an electrical energy associated with the variation in the compensation current into an optical energy, and convert the optical energy into a feedback current;

a compensation capacitor for adjusting a gain of the voltage regulator, and including:

a first end coupled to the cathode terminal of the voltage regulator; and a second end coupled to the reference terminal of the voltage regulator; and a feedback capacitor configured to provide the feedback voltage by storing energy associated with the feedback current.

7. The power supply of claim 6, wherein the linear optocoupler comprises:

a light-emitting diode, including:

an anode first end coupled to the pulse DC voltage; and a cathode coupled to the coupled to the cathode terminal of the voltage regulator; and a phototransistor, including:

a first end coupled to the control circuit; and a second end coupled to the feedback capacitor.

8. The power supply of claim 6, wherein the voltage-stabilizing feedback compensation circuit further comprises:

a third auxiliary switch, including:

a first end coupled to the first end of the feedback capacitor;

a second end; and a control end for receiving a sixth control signal; and a third resistor, including:

a first end coupled to the second end of the third auxiliary switch; and a second end coupled to the first ground level.

9. The power supply of claim 8, wherein the control circuit comprises:

a PWM integrated circuit configured to receive the feedback voltage and provide the first control signal according to the feedback voltage; and an MCU configured to provide the second control signal, provide the third control signal, provide the fifth control signal, receive the logic signal, and provide the sixth control signal according to the logic signal.

10. The power supply of claim 1, wherein the logic circuit is implemented using an AND gate.

11. The power supply of claim 1, wherein the boost active PFC circuit further comprises:

a first storage capacitor for storing energy of the pulse DC voltage, and including a first end coupled to the pulse DC voltage and a second end coupled to the first ground level.

12. The power supply of claim 11, wherein the boost active PFC circuit further comprises a first diode which includes:

an anode coupled to the second end of the boost inductor; and a cathode coupled to the first end of the first storage capacitor.

13. The power supply of claim 11, wherein the resonant converting PFC circuit further comprises:

a second storage capacitor for storing energy of the output voltage, and including a first end coupled to the output voltage and a second end coupled to a second ground level.

14. The power supply of claim 13, wherein the resonant converting circuit further comprises:

a second diode, including:

an anode coupled to the second dotted terminal; and a cathode coupled to the first end of the second storage capacitor; and a third diode, including:

an anode coupled to the third undotted terminal; and a cathode coupled to the first end of the second storage capacitor.

15. The power supply of claim 1, wherein the boost active PFC circuit further comprises a rectifier configured to convert the AC voltage provided by the AC mains into the DC voltage.

\* \* \* \* \*